US012773061B2

(12) United States Patent
Lees et al.

(10) Patent No.: US 12,773,061 B2
(45) Date of Patent: Oct. 27, 2026

(54) COMBINATION OVEN

(71) Applicant: Anova Applied Electronics, Inc., San Francisco, CA (US)

(72) Inventors: Harrison John Lees, San Francisco, CA (US); Scott Martin Heimendinger, San Francisco, CA (US); Carl Håkan Messler, San Francisco, CA (US)

(73) Assignee: Anova Applied Electronics, Inc.

(*) Notice: Subject to any disclaimer, the term of this patent is extended or adjusted under 35 U.S.C. 154(b) by 665 days.

(21) Appl. No.: 18/028,639

(22) PCT Filed: Sep. 16, 2021

(86) PCT No.: PCT/US2021/050587
§ 371 (c)(1),
(2) Date: Mar. 27, 2023

(87) PCT Pub. No.: WO2022/066491
PCT Pub. Date: Mar. 31, 2022

(65) Prior Publication Data

US 2023/0363566 A1 Nov. 16, 2023

Related U.S. Application Data

(60) Provisional application No. 63/084,325, filed on Sep. 28, 2020.

(51) Int. Cl.
*A47J 27/04* (2006.01)
*F24C 15/00* (2006.01)

(52) U.S. Cl.
CPC ............. *A47J 27/04* (2013.01); *F24C 15/003* (2013.01); *F24C 15/006* (2013.01); *A47J 2027/043* (2013.01)

(58) Field of Classification Search
CPC .... F24C 15/327; F24C 15/003; F24C 15/006; F24C 13/00; A47J 27/04
(Continued)

(56) References Cited

U.S. PATENT DOCUMENTS 4,770,888 A 9/1988 Loeb
4,924,072 A 5/1990 Oslin
(Continued)

FOREIGN PATENT DOCUMENTS

CN 108061160 A 5/2018
DE 10335295 B4 2/2008
(Continued)

OTHER PUBLICATIONS

International Preliminary Report on Patentability and Written Opinion for International Application No. PCT/US2021/050587, dated Mar. 28, 2023, 11 pages.
(Continued)

*Primary Examiner* — Vivek K Shirsat
(74) *Attorney, Agent, or Firm* — Chrisman Gallo Tochtrop LLC

(57) ABSTRACT

A steam oven having a housing, a cooking chamber located within the housing, a water tank receptacle connected to the housing, the water tank receptacle comprising: a reservoir, an inlet fitting positioned above the reservoir, a false bottom positioned above the reservoir, and a reservoir outlet extending through a bottom of the reservoir. A water tank is selectively positionable on the water tank receptacle above the false bottom, the water tank having an outlet fitting configured to fluidily connect to the inlet fitting upon positioning the water tank on the water tank receptacle.

15 Claims, 9 Drawing Sheets

(58) Field of Classification Search
USPC .............. 126/369, 20; 219/401, 682; 99/467
See application file for complete search history.

(56) References Cited

U.S. PATENT DOCUMENTS

| | | | | |
|---|---|---|---|---|
| 5,077,065 | A | 12/1991 | Ash et al. | |
| 5,515,773 | A * | 5/1996 | Bullard | A47J 27/04 126/369 |
| 6,157,006 | A | 12/2000 | Sickles et al. | |
| 6,521,871 | B1 | 2/2003 | Shelton | |
| 7,612,315 | B2 | 11/2009 | Corradini | |
| 8,207,477 | B2 | 6/2012 | Embury et al. | |
| 8,993,934 | B2 | 3/2015 | Giazzon et al. | |
| 9,016,285 | B2 | 4/2015 | Riddick | |
| 9,060,523 | B1 | 6/2015 | Buller-Colthurst | |
| 2006/0289507 | A1 | 12/2006 | Corradini | |
| 2007/0092616 | A1 | 4/2007 | Witte et al. | |
| 2008/0202350 | A1 | 8/2008 | Maki | |
| 2009/0133684 | A1 | 5/2009 | Embury et al. | |
| 2009/0250452 | A1* | 10/2009 | Tse | F24C 15/327 219/400 |
| 2013/0306083 | A1 | 11/2013 | Riddick | |
| 2017/0049257 | A1 | 2/2017 | Shelton et al. | |
| 2017/0188613 | A1 | 7/2017 | Rosales et al. | |
| 2017/0351278 | A1 | 12/2017 | Raghavan et al. | |
| 2018/0213801 | A1 | 8/2018 | Morey et al. | |
| 2018/0213963 | A1 | 8/2018 | Morey et al. | |
| 2020/0284451 | A1* | 9/2020 | Yang | F24F 6/02 |

FOREIGN PATENT DOCUMENTS

| | | | | |
|---|---|---|---|---|
| EP | 0701388 | A2 | | 3/1996 |
| EP | 1477091 | A1 | | 11/2004 |
| EP | 2390587 | A2 | | 11/2011 |
| EP | 2746682 | A2 | | 6/2014 |
| JP | 2005110941 | A | | 4/2005 |
| KR | 20070054993 | A | | 5/2007 |
| KR | 1018327 | B1 | * | 3/2011 |
| WO | 8604206 | A1 | | 7/1986 |
| WO | 2005111509 | A1 | | 11/2005 |

OTHER PUBLICATIONS

International Search Report and Written Opinion for International Application No. PCT/US2021/050587, dated Mar. 24, 2022, 14 pages.

Alkar Technical Reports—The Real Truth About Cooking, downloaded at www.h2oop.com/wp=content/uploads/2014/12/Alkar-Technical-Reports-The Real Truth About Cooking.htm, 2014, 3 pages.

Grande, "White Paper: Using Humidity Control in Heat Processing", www.infratrol.com/news/2014-07-08_White-Paper-Humidity-Control-Systems.html, 2014, 2 pages.

International Preliminary Report on Patentability for International Application No. PCT/US2020/052209, dated Mar. 15, 2022, 9 pages.

International Search Report and Written Opinion for International Application No. PCT/US2020/052209, mailed Feb. 3, 2021, 13 pages.

Why is Humidity Important in Cooking, 2019, downloaded at https://www.scienceofcooking.com/why_is_humidity_important_in_cooking.htm, 2 pages.

Final Office Action for U.S. Appl. No. 17/029,809 mailed Jun. 29, 2023, 23 pages.

* cited by examiner

COMBINATION OVEN

This application is a U.S. National Phase application of PCT International Application No. PCT/US2021/050587, filed Sep. 16, 2021, which claims the benefit of U.S. Provisional Application No. 63/084,325, filed Sep. 28, 2020, both of which are incorporated by reference herein.

BACKGROUND

Culinary ovens have historically allowed the user to set a cooking temperature that the oven's internal thermostat moderates. The oven maintains a stable cooking temperature, within a margin of error, and cooking processes can proceed with predictable timing and results: your chicken roasts at 375° F. for an hour and is reliably cooked.

However, both professional and home cooks have grown in their sophistication and in the level of expected precision in their cooking appliances. This increase in sophistication is owed, in part, to the introduction of sous vide cooking (cooking in a heated liquid bath) to mainstream consumers over the past 10 years. While the actual measured temperature of the air in a traditional oven might fluctuate 20° F. above and below the user's target temperature, consumer sous vide devices can maintain a cooking temperature within a tolerance of around 0.2° F.

This dramatic increase in the precision of cooking temperature allows for much greater control of food doneness. For instance, the temperature difference between a rare and medium-rare steak is less than 10° F.—smaller than the margin of error in most conventional ovens. The texture of whole eggs or egg-based dishes is even more sensitive to temperature.

In addition to precise temperature control, the sous vide cooking method prevents foods from drying out, even during long cooking or holding times. In sous vide, the food is sealed in a pouch—commonly a vacuum-sealed plastic bag, but alternatively in sealed silicone bags, or jars. The sealed environment means that the water content of the food has nowhere to escape during the cooking process.

However, the sous vide method has limitations. For example, foods must be sealed to avoid becoming waterlogged in the cooking bath, so some dishes fundamentally aren't suited to sous vide cooking. A whole chicken, for example, is hard to fit into a bag, and leaves a void in the middle of its cavity that will slow down the cooking process. Also, because foods are sealed, cooking operations that specifically require evaporation are unachievable in the sous vide method. This includes almost all baking, roasting, and frying. And, because the sous vide method heats the food via a temperature controlled water bath, the cooking environment can never exceed 100° C./212° F.—the nominal boiling point of water. This low temperature limit means that all sous vide cooking takes place at temperatures well below the threshold for browning reactions.

To overcome these limitations, some modern ovens include steam generators to allow cooking to occur over a range of humidity levels in addition to temperatures. While such "combination ovens" (also known as steam ovens or combi-ovens) have been on the market for some time, they typically are provided as wall-mounted units that are not portable or storable. Furthermore, known portable devices can have limitations, such as excess overall size, small oven capacity for a given overall size, ergonomic limitations (e.g., difficulty in adding water or cleaning the oven), and so on.

The inventors have determined that the state of the art of combination ovens can still be advanced.

This description of the background is provided to assist with an understanding of the following explanations of exemplary embodiments, and is not an admission that any or all of this background information is necessarily prior art.

SUMMARY

In one exemplary aspect, there is provided a steam oven comprising: a housing (106); a cooking chamber (102) located within the housing; a water tank receptacle (600) connected to the housing, the water tank receptacle comprising: a reservoir (606), an inlet fitting (604) positioned above the reservoir, a false bottom positioned above the reservoir, and a reservoir outlet (802) extending through a bottom of the reservoir; and a water tank (108) selectively positionable on the water tank receptacle (600) above the false bottom, the water tank having an outlet fitting (602) configured to fluidly connect to the inlet fitting upon positioning the water tank on the water tank receptacle.

In another exemplary aspect, there is provided a steam oven comprising: a housing (106) having a lower wall and an upper wall; a cooking chamber (102) located within the housing; a water tank receptacle (600) connected to the housing; a water tank (108) selectively positionable on the water tank receptacle (600); an electronics housing (928) located within the housing and extending from an air inlet (1102) located adjacent the lower wall to an air outlet (1104) located adjacent the upper wall; and a printed circuit board (926) extending vertically within the electronics housing.

BRIEF DESCRIPTION OF THE DRAWINGS

Exemplary embodiments of the invention are described with reference to the accompanying drawings, in which like reference numbers are used to illustrate like parts.

DETAILED DESCRIPTION OF EXEMPLARY EMBODIMENTS OF THE INVENTION

This description provides examples of various inventions relating to combination ovens. The inventions may be used together or separately. The examples described herein are not intended to limit the inventions provided by the present disclosure.

Figure 1:
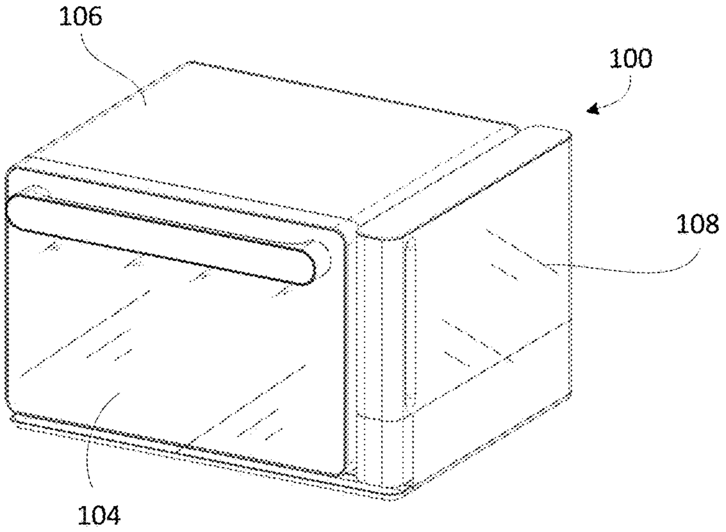
FIG. 1 is an isometric view of an exemplary embodiment of a combination oven.
Figure 2:
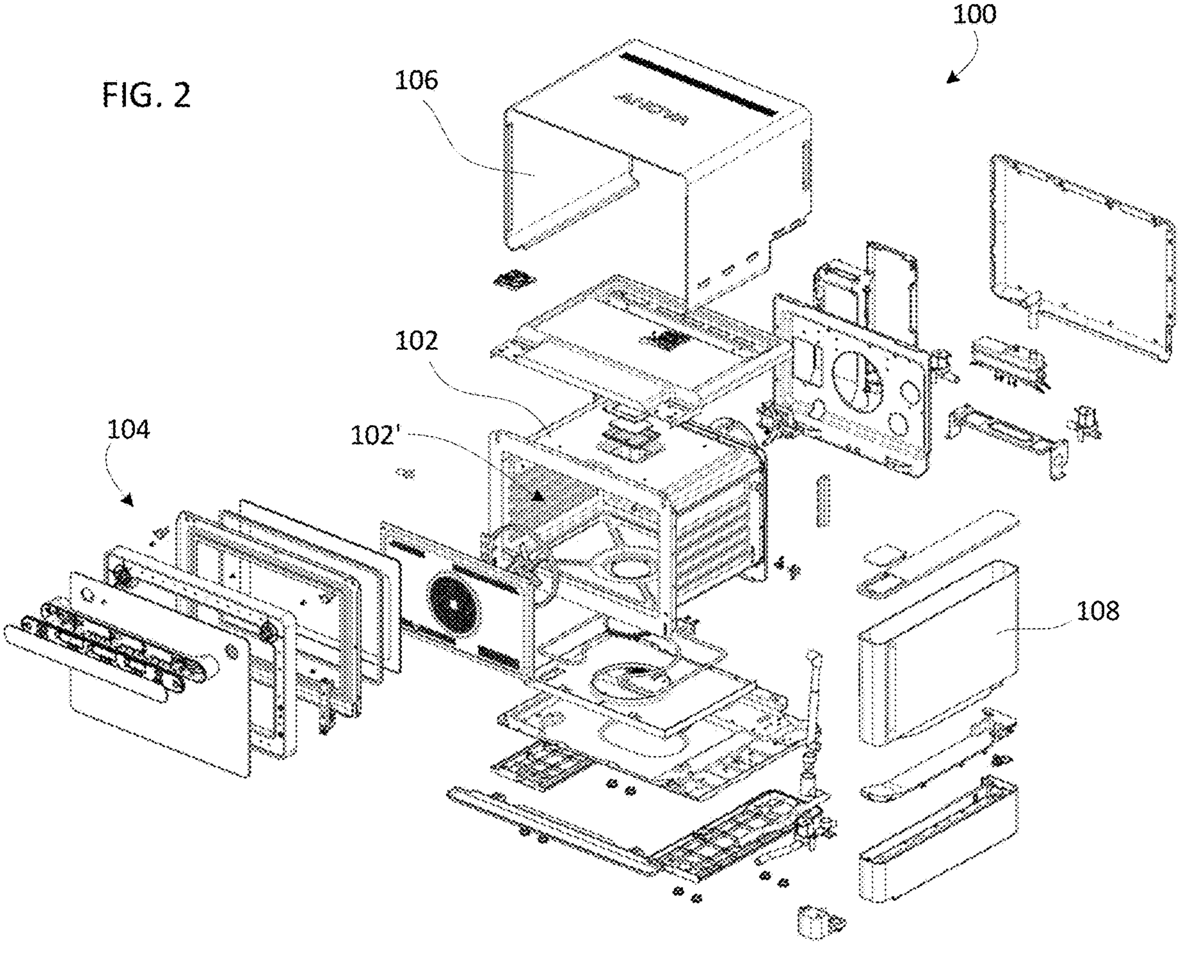
FIG. 2 is an exploded view of the combination oven of FIG. 1.

FIGS. 1 and 2 illustrate an exemplary combination oven 100. The oven 100 generally includes: a cooking chamber 102 having a cavity 102' for receiving food, a door assembly 104 configured to selectively cover and uncover an open side of the cooking chamber 102 to close and open the cavity 102', respectively; an external housing 106; and a water tank 108. The water tank 108 is shown as a removable tank, but it may be fixed in place. The water tank 108 also may be contained internally, or exposed to the outside of the oven 100 such as in the shown example. Other details of the oven 100 are described in detail in relation to FIGS. 3-6, which are larger reproductions of the exploded view of FIG. 2.

Figure 3:
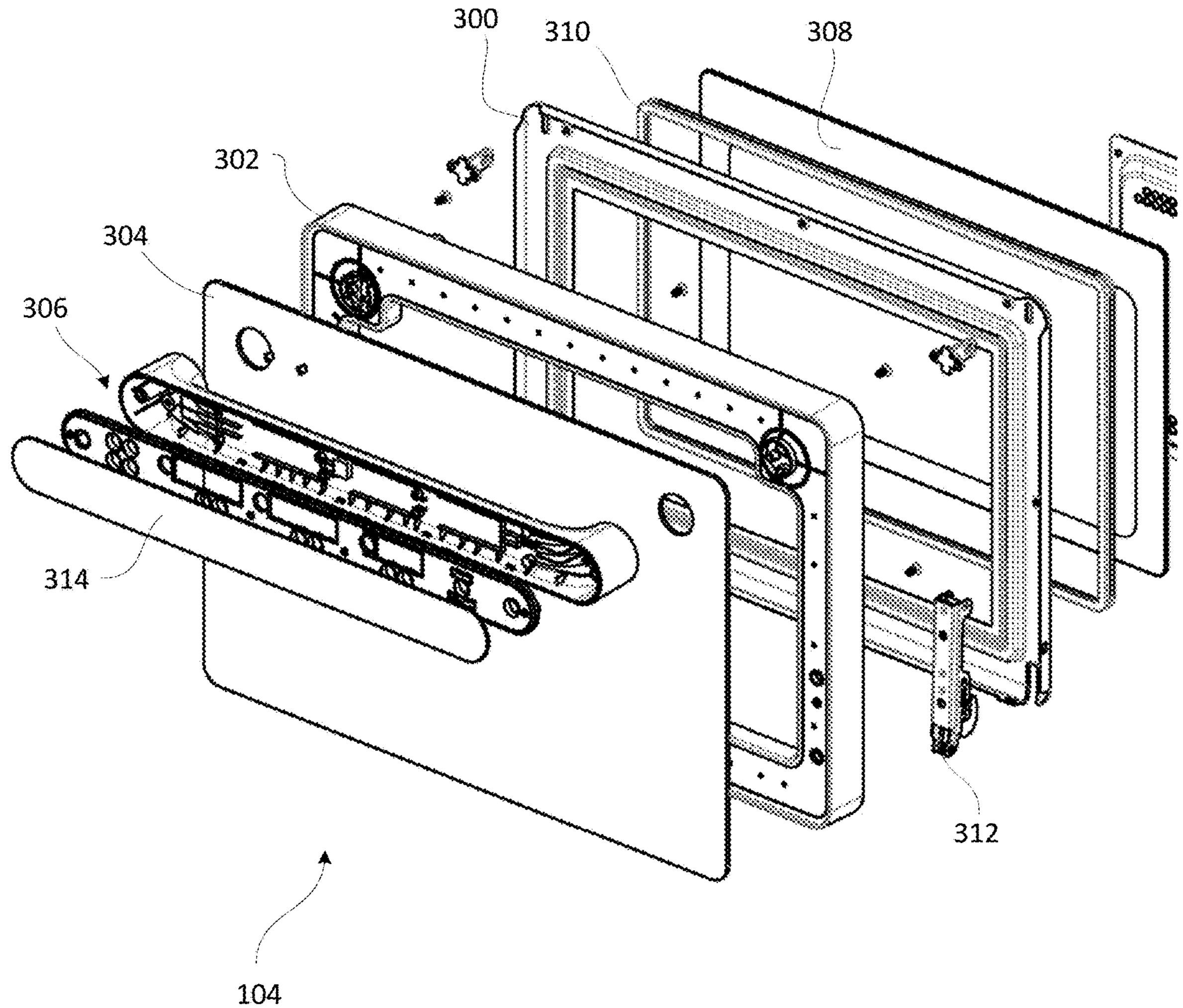
FIG. 3 is a detailed exploded view of the door assembly of the combination oven of FIG. 1.

Referring to FIG. 3, the exemplary door assembly 104 includes an inner frame 300, an outer frame 302, exterior glass 304, a handle 306, interior glass 308, a perimeter seal 310, and hinges 312. The parts of the door assembly 104 are secured together using screws, rivets, welds, adhesives, and so on. When assembled, the exterior glass 304 faces outside the oven 100, and the interior glass 308 faces the cooking chamber cavity 102'. If desired, the exterior glass 304 and/or interior glass 308 may be replaced with metal panels or the like. The perimeter seal 310 faces towards the cooking chamber 102, and seals the cavity 102' when the door is closed. The hinges 312 join the door assembly 104 to the remainder of the oven 100, such as by being secured to a rigid frame of the oven 100. In the shown example, the hinges 312 are bottom hinges, but side or top hinges may be used instead. The handle 306 is configured to be grasped to control the position of the door assembly 104, as known in the art. The handle 306 also may include features such as a user interface 314 having input controls and output displays. The door assembly 104 may also include a lock to secure the door assembly 104 in the closed position.

Figure 4:
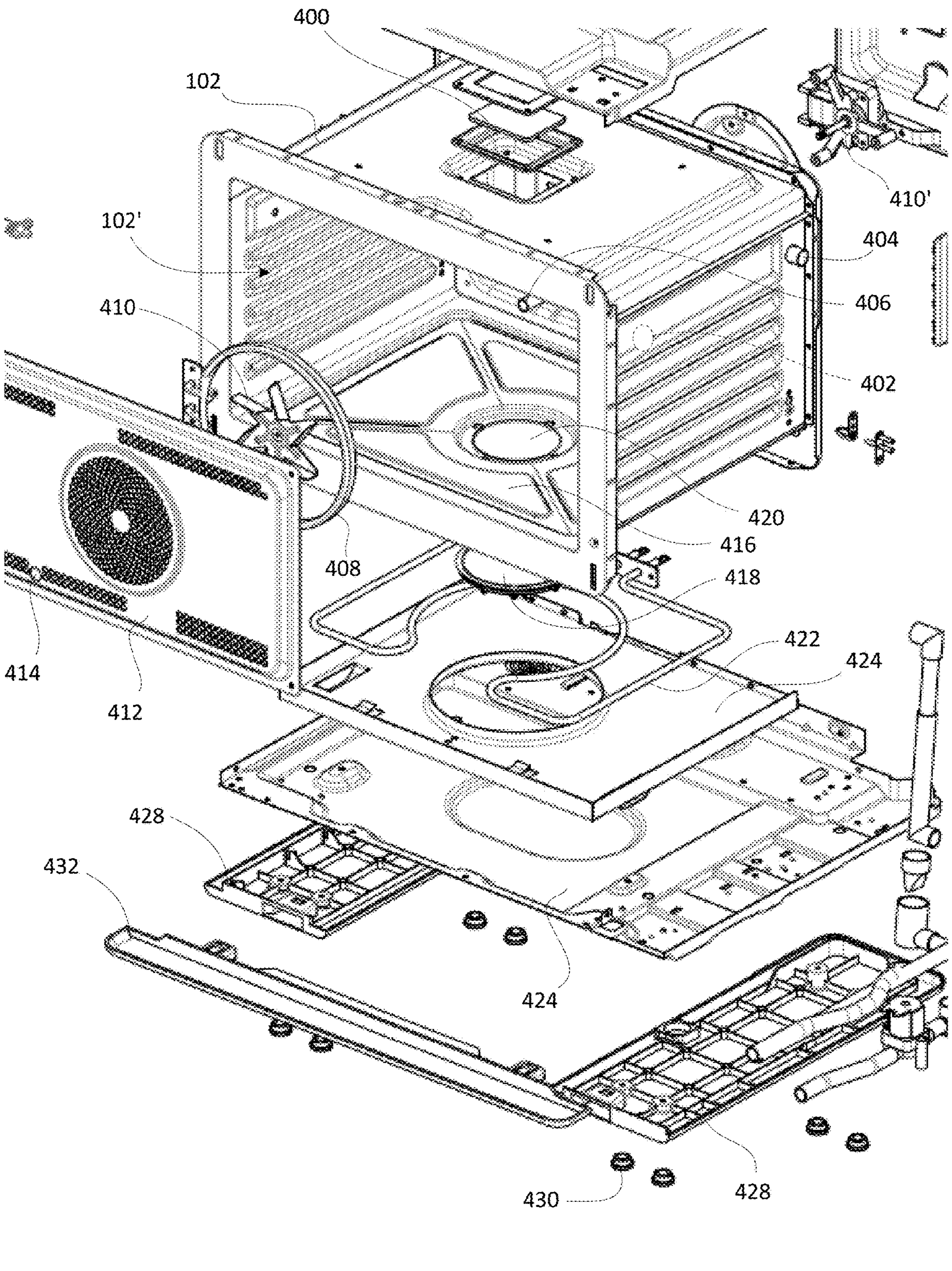
FIG. 4 is a detailed exploded view of the cooking chamber and other portions of the combination oven of FIG. 1.

FIG. 4 shows the cooking chamber 102 and cavity 102' in greater detail. the cooking chamber 102 comprises a plurality of generally flat walls that form a rectangular cavity 102' for receiving food for cooking. The walls may have exterior insulation (not shown), and may include any desired configuration of shelf supports and the like. In the shown example, an oven light assembly 400 (e.g., an incandescent bulb or LED light) is provided in a corresponding opening in the top wall of the cooking chamber 102. The cooking chamber 102 includes a steam inlet 402, a steam outlet 404, and may also include a descaling liquid passage 406.

A rear heating element 408 and fan 410 are mounted to a back wall of the cooking chamber 102, and covered by a rear panel 412. The rear panel 412 includes perforations or other openings through which air heated by the rear heating element 408 can flow when the fan 410 is operated by a motor 410' located behind and outside the cooking chamber 102. The rear panel 412 also may include features such as a descaling opening 414 to receive the descaling liquid passage 406. The steam inlet 402 and steam outlet 404 also may be located behind the rear panel 412, but this is not required.

The bottom wall 416 of the cooking chamber 102 may be dished to cause liquids, such as condensed water from steam and drippings from food, to flow towards a low point of the bottom wall 416. The low point allows more controlled and convenient collection and subsequent cleaning of liquids. Optionally, the low point may include features such as a drain, or a condensate heater 418 to reheat condensate back into steam. For example, in this case, the condensate heater 418 is mounted in a corresponding opening 420 at the center of the bottom wall 416.

A lower heating element 422 is installed below the bottom wall 416 of the cooking chamber 102 to provide indirect heating and to protect the lower heating element 422 from contact with liquids and food. The lower heating element 422 is positioned above a lower heat shield 424, which prevents excessive heat transfer to a bottom enclosure wall 426 forming the lower exterior wall of the oven 100.

It will be readily appreciated that the cooking chamber 102 may have different arrangements of heaters and related elements. For example, the lower heating element 422 may be located inside the cavity 102'. As another example, an upper heating element (not shown) may be installed at the top of the cooking chamber 102, either inside or outside the cavity 102'. Other alternatives and variations will be apparent to persons of ordinary skill in the art in view of the present disclosure.

FIG. 4 also shows base supports 428 that extend from the bottom enclosure wall 426 to hold the oven 100 on a horizontal surface such as a countertop via elastic feet 430. Any number and configuration of base supports 428 and feet 430 may be used. The oven 100 also may include a drip tray 432 that is configured to recover excess liquid from the steam system, as discussed in more detail below. The drip tray 432 in this case is conveniently located at the front of the base supports 428, and may be secured to the base supports 428 by screws or other fasteners. The drip tray 432 may optionally be removable by the user for easy emptying, such as by mounting it to the base supports 428 by snap fitments that can be released without tools. However, it has been found that regular evaporation can be sufficient, at least in some cases, to eliminate the contents of the drip tray 432, making it unnecessary for a user to remove the drip tray 432 during normal use.

Figure 5:
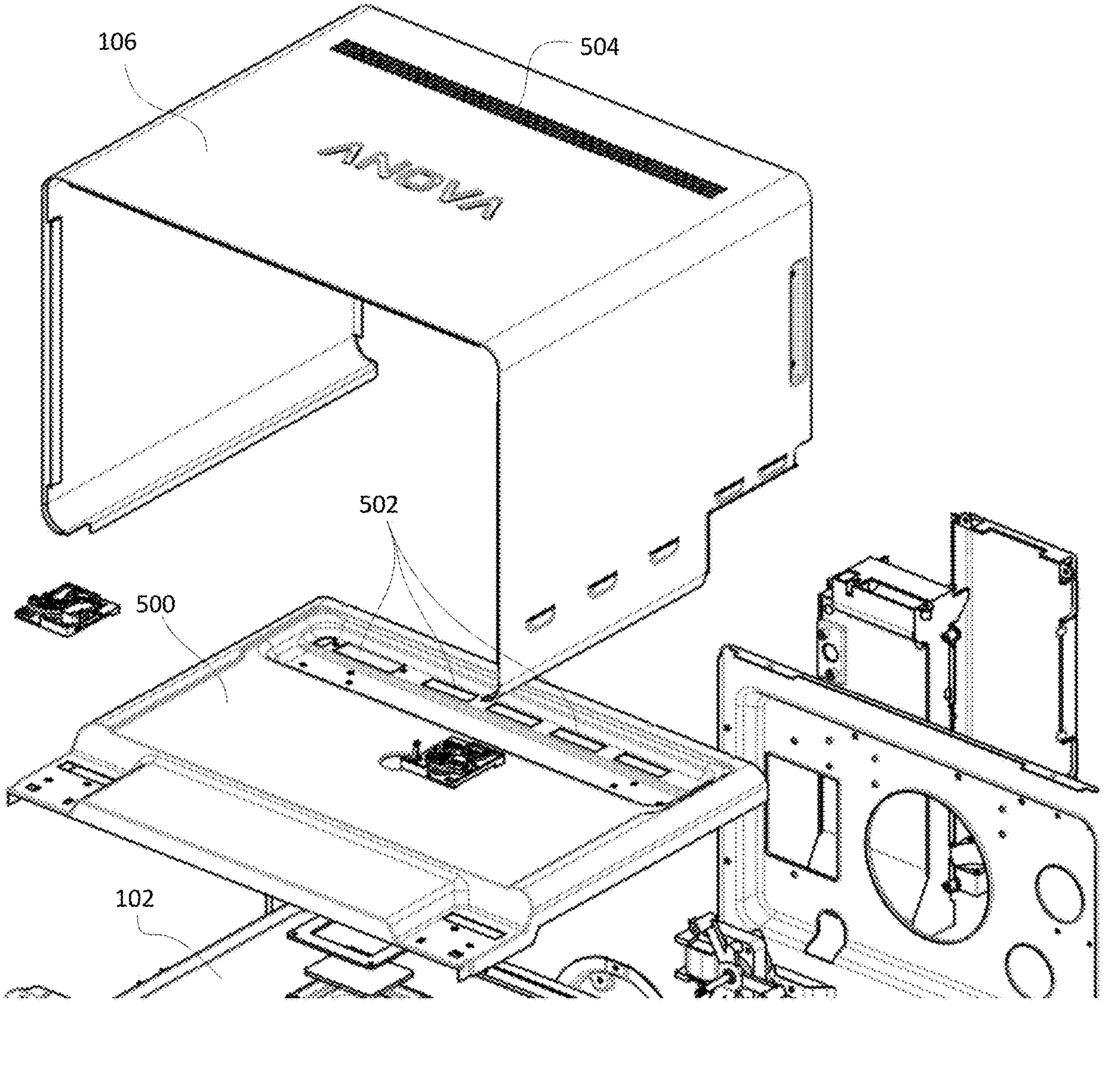
FIG. 5 is a detailed exploded view of the upper cover and other portions of the combination oven of FIG. 1.

Referring now to FIG. 5, an upper heat shield 500 may be located between the external housing 106 and the cooking chamber 102. The upper heat shield 500 insulates the external housing 106 from excess heat transfer from the cooking chamber 102. In this example, the upper heat shield 500 also includes ventilation passages 502, located behind the cooking chamber 102, for evacuating hot air generated by components behind the cooking chamber 102, as explained in more detail below. The external housing 106 also may include ventilation passages 504 for transferring the heated air out of the oven 100.

Figure 6:
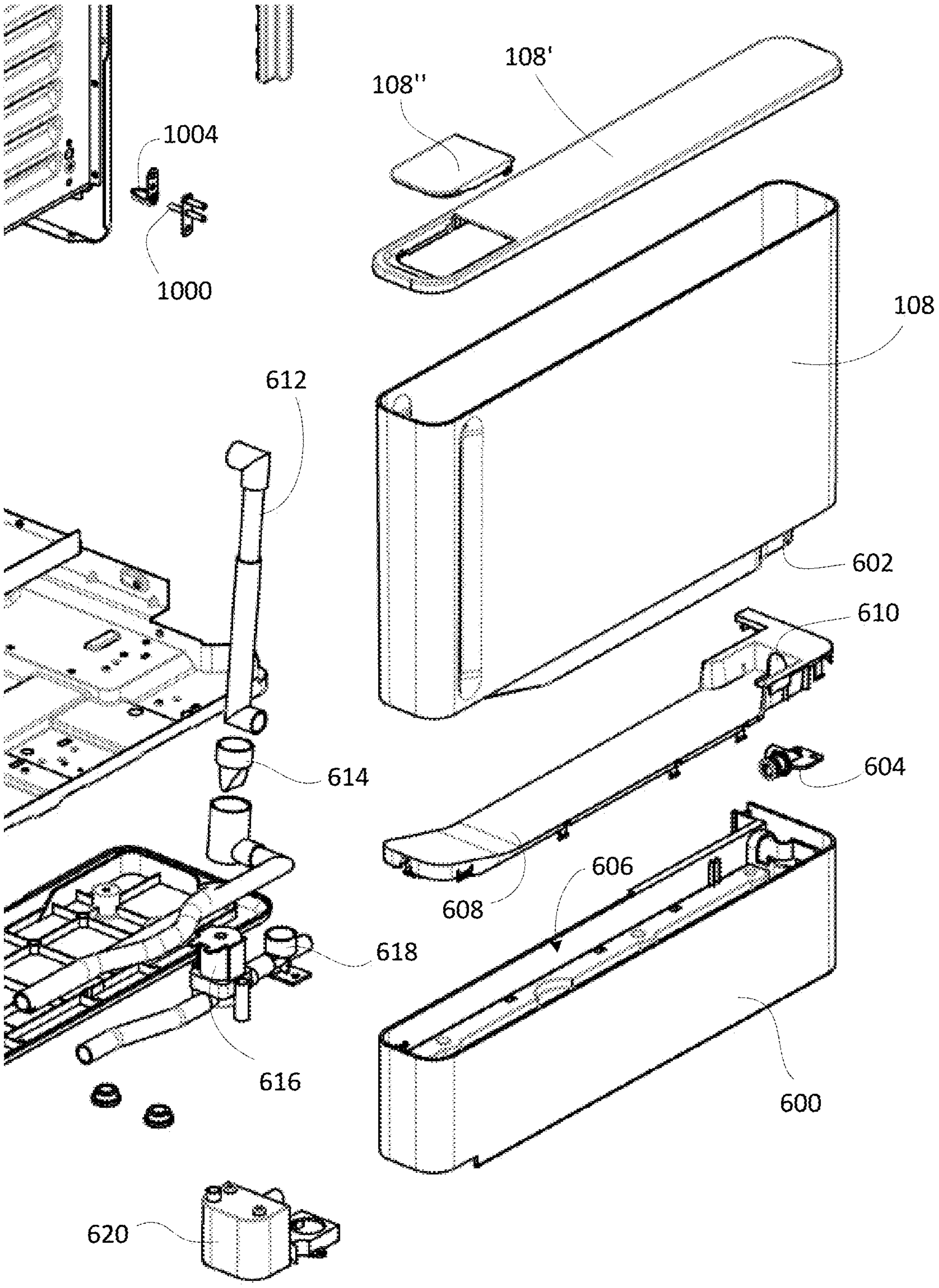
FIG. 6 is a detailed exploded view of the water tank and other parts of the combination oven of FIG. 1.

FIG. 6 shows the water tank 108 and various related features of the oven 100. The water tank 108 is an externally-mounted tank that fits into a receptacle 600 located at the side of the oven 100. The water tank 108 may include any suitable access opening for filling the water tank 108 with water. For example, the water tank 108 may include a top wall 108' having an pivotally-mounted access door 108". The top wall 108' may be removable or fixed in place. In other cases, the access opening may include a threaded cap, or other devices as known in the art. The water tank 108 also may include a fill indicator, such as a capacitive water level sensor, a float that operates a magnetic switch located in the oven housing, and so on.

The water tank 108, which in this case is removable from the rest of the oven 100, is configured to be fluidly connected and disconnected from the rest of the oven 100. In the shown example, the water tank 108 has an outlet fitting 602 that connects with an inlet fitting 604 that is secured to the receptacle 600. The inlet fitting 604 is secured within an upward-facing reservoir 606 at the top of the receptacle 600. A false bottom 608 also may be secured within the reservoir 606, with the inlet fitting 604 being accessible through the false bottom 608 via an opening 610.

Figure 7A:
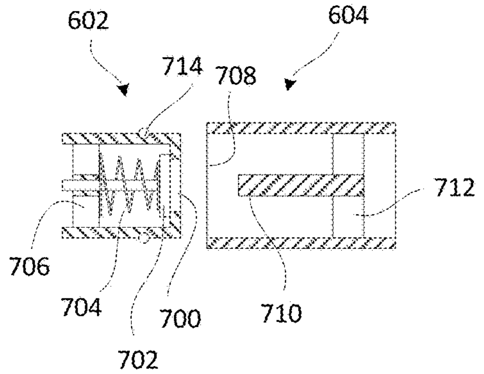
FIGS. 7A and 7B show an exemplary fitting assembly for a water tank.
Figure 7B:
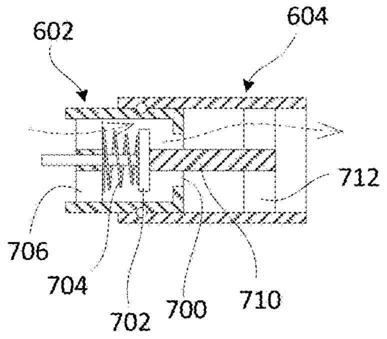

An exemplary outlet fitting 602 and inlet fitting 604 system is shown in FIGS. 7A and 7B. The outlet fitting 602 comprises an outlet opening 700, a plunger 702, and a spring 704. The spring 704 is located between internal ribs 706 and the plunger 702, and biases the plunger 702 against the outlet opening 700 to seal the outlet opening 700. The inlet fitting 604 comprises an inlet opening 708 having a pin 710 suspended therein by internal ribs 712. In each case, the ribs 706, 712 are configured to allow liquid to pass through the respective fitting 602, 604. The inlet opening 708 is dimensioned to receive the outlet opening 700 in a fluid-tight manner, such as by having an O-ring 714 or other seal therebetween. The pin 710 is positioned to push the plunger 702 away from the outlet opening 700 against the bias of the spring 704 when the outlet fitting 602 is inserted into the inlet fitting 604, which allows water to flow through the fittings 602, 604.

Figure 8:
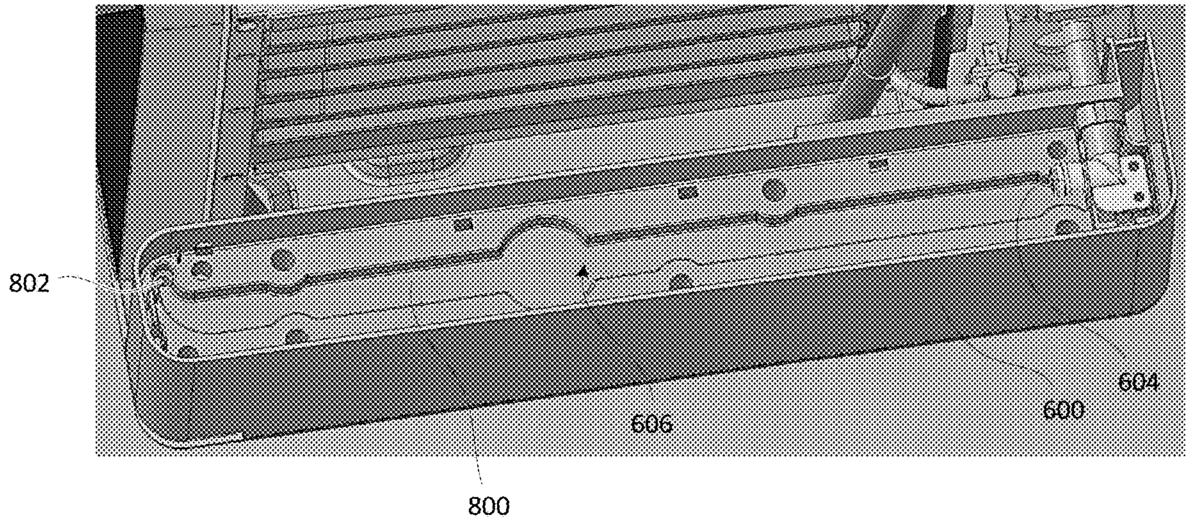
FIG. 8 is a view into the reservoir of FIG. 6.

When the water tank 108 is removed from the receptacle 600, the spring 704 pushes the plunger 702 against the outlet opening 700 to seal the water tank 108. The inlet fitting 604 can also be provided with a spring-biased sealing element, but in the shown embodiment it does not have any sealing mechanism to close the inlet fitting 604 when the outlet fitting 602 is removed. In either case (and likely more so in the shown embodiment), a quantity of water might be released during installation and removal of the water tank 108. While the quantity of free water might be negligible during normal use, improper attempts to install the water tank 108 might cause excess water spills. To address both situations, the opening 610 though the false bottom 608 is positioned to receive any spilled water and convey it to the reservoir 606 below the false bottom 608. A gap is provided between the bottom of the reservoir 606 and the false bottom 608, such that the water can pool in the reservoir 606 out of sight of the user. There, the water can evaporate over time. In addition, as shown in FIG. 8, the reservoir 606 may include a water channel 800 that is configured to convey the spilled water to an outlet 802 via which the water can be conveyed to the drip tray 432 or to another receptacle.

In the shown exemplary embodiment, the reservoir 606 provides a convenient and effective way to address the problem of spilled water, by holding or redirecting the water until it evaporates or is otherwise removed. Furthermore, the false bottom 608 conceals the water from the user during such removal, which prevents exposure to such water and provides an aesthetic benefit, both of which are expected to improve the user's satisfaction with how the oven 100 addresses water spills.

Referring back to FIG. 6, the oven 100 also includes features for managing the steam exiting from the cooking chamber 102. In the shown example, a steam outlet hose 612 is provided to connect to the steam outlet 404 from the cooking chamber 102. The steam outlet hose 612 may direct the steam to a simple opening for release to the atmosphere, but more preferably directs the steam to a steam management system having one or both of a pressure relief valve 614 and an controllable bypass valve 616.

The pressure relief valve 614 opens automatically when the pressure in the steam outlet hose 612 reaches a predetermined value. For example, the pressure relief valve may comprise a so-called duckbill valve having flexible membranes (usually two) that contact each other at their edges to form a barrier between a regulated side and an atmospheric side. When the pressure on a regulated side is below a threshold value, the membranes remain in contact due to resilient biasing of the material. When the pressure on the regulated side exceeds the threshold value, the pressure causes the membranes to move away from each other to allow the steam to pass to the atmospheric side. The membranes join each other at an angle (thus the name "duck-bill"), which generally prevents reverse flow from the atmospheric side to the regulated side.

The controllable bypass valve 616 is connected in parallel with the pressure relief valve 614, and comprises an electrically (e.g., solenoid- or motor-operated) or manually operated valve that can be opened to release steam from the cooking chamber 102 before the steam reaches the threshold pressure necessary to open the pressure relief valve 614. Such valves are known in the art of fluid controls and need not be described in detail herein. This provides the opportunity to evacuate steam at any time during operation of the oven 100. For example, if it is desired to transition from a cooking mode using steam to a dry cooking mode, or if it is desired to reduce the relative humidity in the cooking chamber 102, the controllable bypass valve 616 can be opened to release some of all of the steam. The evacuation of steam can be assisted by simultaneously operating the oven fan 410 to bring in atmospheric air into the cooking chamber 102 via one or more inlets (not shown) to force out the steam.

The pressure relief valve 614 and controllable bypass valve 616 may be configured in any suitable arrangement within the oven 100. In the shown embodiment, they are conveniently located within the water tank receptacle 600. In this embodiment, the steam outlet hose 612 leads to a manifold 618, which splits off in parallel to the pressure relief valve 614 and the controllable bypass valve 616. The outlets of the pressure relief valve 614 and controllable bypass valve 616 are conveniently connected to an exhaust manifold 620, which directs the exiting steam downwards towards the drip tray 432, which is concealed under the door assembly 104 when it is closed. While not strictly required, this evacuation path helps by consolidating the steam output at a single location where it is unlikely to be contacted by the user. Furthermore, directing the steam to an outlet at or near the bottom and front of the oven 100 gives the steam additional time to cool before it is released to the atmosphere, provides a downhill path to assist the movement of condensate, and helps avoid ejecting the steam into the proximity of walls and cabinets that might surround the oven 100.

As a further benefit, the outlet 802 of the reservoir 606 also may pass through the exhaust manifold 620 on the way to the drip tray 432, providing a single outlet location for all steam and water.

Figure 9:
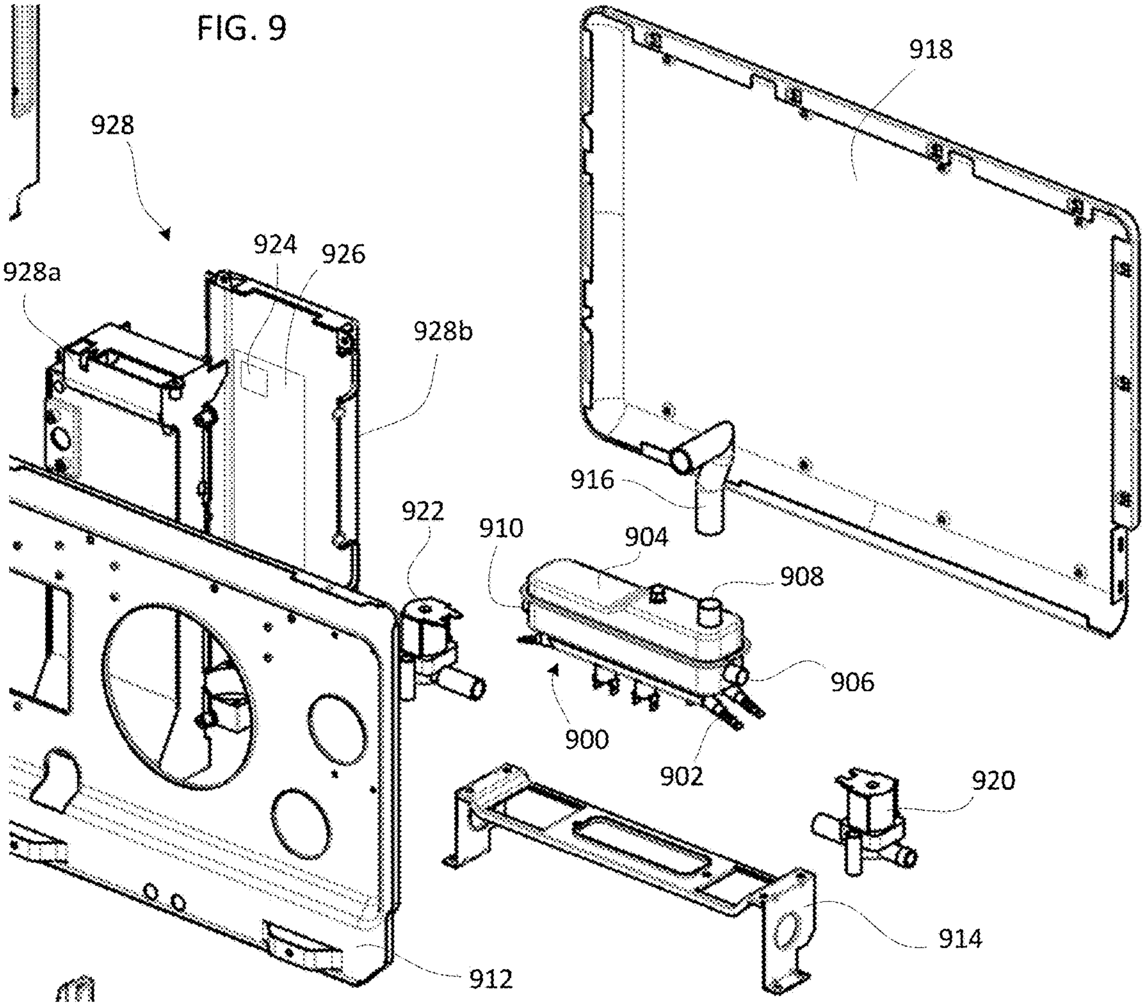
FIG. 9 is a detailed exploded view of the steam generator and other parts of the combination oven of FIG. 1.

Referring now to FIG. 9, the oven 100 also includes a steam generator 900 that is configured to convert water from the water tank 108 into steam. The steam generator 900 may include any suitable vessel having a heating element, such as known in the art. In the shown example, the steam generator 900 has two linear heating elements 902 that extend along the bottom of a vessel 904. The vessel 904 has a water inlet 906, a steam outlet 908, and a descaling outlet 910. The steam outlet 908 preferably is located above the water inlet 906 to prevent water from exiting though the steam outlet prior to vaporization into steam. The descaling outlet 910 preferably is located at or below the level of the water inlet 906 to allow water and accumulated scale and debris to drain from the vessel 904 during a self-cleaning process.

The steam generator 900 may be installed at any suitable location within the oven 100. In the shown example, the steam generator 900 is located behind the cooking chamber 102, with a rear heat shield 912 located between the steam generator 900 and the cooking chamber 102. The exemplary steam generator 900 is mounted on a bracket 914 that elevates the steam generator 900 above the bottom enclosure wall 426. The rear heat shield 912 and bracket 914 are expected to both help isolate the steam generator 900 from the surroundings, to thereby prevent unwanted heat conduction paths within the oven 100. A steam outlet hose 918 connects the steam generator's steam outlet 908 to the steam inlet 402 leading into the cooking chamber 102. The steam generator 900 and other parts at the rear of the oven 900 are covered by a rear enclosure cover 918, which may be insulated.

Figure 10:
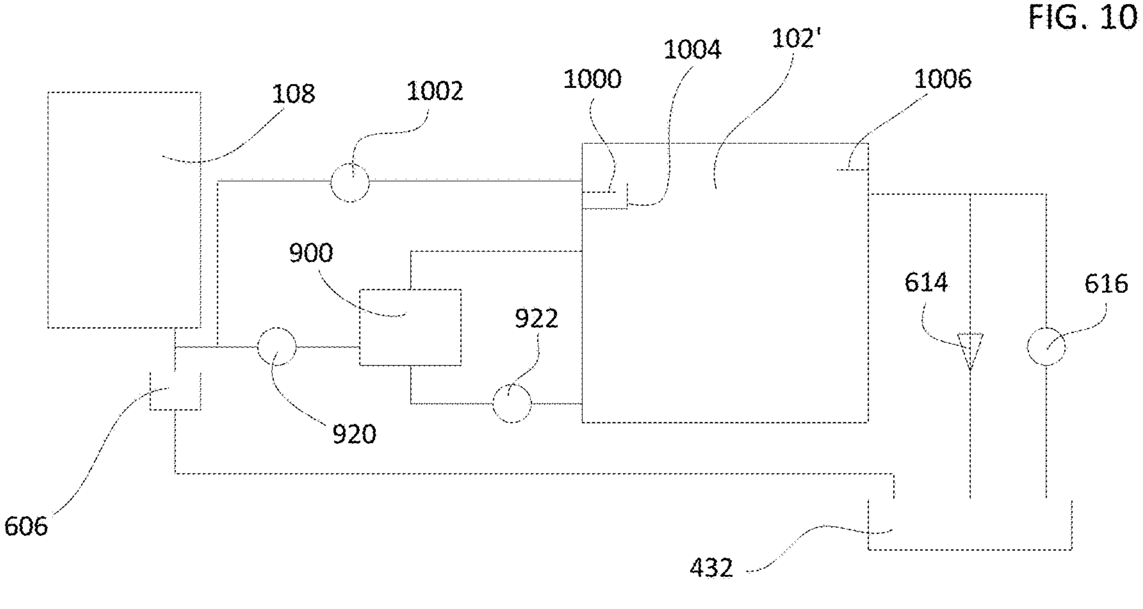
FIG. 10 is a schematic illustration of an exemplary water system that may be used with embodiments of combination ovens.

Referring now also to FIG. 10, a variety of pump and/or valve systems may be used to control the flow of water from the water tank 108 to the remainder of the oven's water system. In the shown example, the water tank 108 is connected to the steam generator's water inlet 906 by an inlet valve 920, and a descaling circuit valve 922 connects the steam generator's descaling outlet 910 to the descaling liquid passage 406 leading into the oven cavity 102'. The oven 100 also may include a wet bulb thermometer 1000 located within the oven cavity 102', in which case a thermometer valve 1002 may be provided to selectively control flow from the water tank 108 to a reservoir 1004 surrounding the wet bulb thermometer 1000. Details of exemplary wet bulb thermometer systems are described in U.S. patent application Ser. No. 17/029,809, filed Sep. 23, 2020, which is incorporated herein by reference in its entirety.

The inlet valve 920, descaling circuit valve 922 and thermometer valve 1002 are operated by a control system, such as a microcontroller 924 that is electrically connected to the valves by wires or the like. The microcontroller 924 may include, for example, an ALU (arithmetic logic unit), PC (program counter), SP (stack pointer), registers, read-only memory (ROM), random access memory (RAM), parallel I/O ports, serial I/O ports, counters, and a clock circuit. Instructions are stored in a non-volatile manner in the memory, and the instructions can be executed to generate output signals to control the flow valves. The microcontroller 924 also may be operatively connected to the heating elements 408, 418, 422, steam generator 900, user interface 314, and so on. The microcontroller 924 and other electrical components, such as power switching devices (e.g., MOSFETs, IGBTs, TRIACs, etc.), may be mounted on one or more printed circuit boards (PCBs) 926. Details of the electronics and electronic connections will be understood by those of ordinary skill in the art of oven design, and need not be described in detail herein.

In the shown example, the inlet valve 920, descaling circuit valve 922 and thermometer valve 1002 are electrically operated (e.g., by solenoids), and when opened allow water to flow by gravity from the source to the destination. In this configuration, when the oven 100 is positioned for cooking operations, the water tank outlet fitting 602 is higher than the steam generator's water inlet 906, and the wet bulb thermometer reservoir 1004, and the descaling outlet 910 is higher than the descaling liquid passage 406. Thus, water can flow by gravity as necessary to operate the oven's water system. In other examples, one or more of the valves may be replaced by a pump. This replacement may be desired to provide more affirmative control of water flow volumes (e.g., by using a peristaltic pump or other positive displacement pump), or to provide flow against the influence of gravity if it is desired to arrange the parts in different relative vertical positions. In addition, one or more of the valves may be omitted entirely. For example, the steam generator's inlet valve 920 may be completely omitted, such that there is open communication between the water supply inlet fitting 604 and the steam generator 900 at all times. This configuration might be desirable, for example, if the inlet fitting 604 includes a closure valve to prevent backpressure from the steam generator from reversing flow through the supply inlet fitting 604, or if such reverse flow is otherwise not expected to be present to any significant degree. Other alternatives and variations will be apparent to persons of ordinary skill in the art in view of the present disclosure.

In use, the valves are operated to provide the desired cooking operations. For example, the microcontroller 924 may be programmed with instructions that open the steam inlet valve 920 to fill the steam generator 900, activate the steam generator 900 to convert water to steam, and operate the controllable bypass valve 616 to remove steam to regulate the relative humidity within the oven cavity 102'. The oven 100 may include one or more wet bulb thermometers 1000 and/or dry bulb thermometers 1006, which are wired to the microcontroller 924, to provide feedback regarding the state of the atmosphere within the cavity 102'. Other sensors, such as one or more pressure sensors, also may be incorporated into the control system. Also, the wet bulb thermometer 1000 may be replaced by other devices for measuring or deriving relative humidity, as known in the art. The exact programming and operation of the oven 100 may vary depending on the desired cooking programs and functionality, and it is not necessary for describing the inventions herein to address details of such programming herein.

Figure 11:
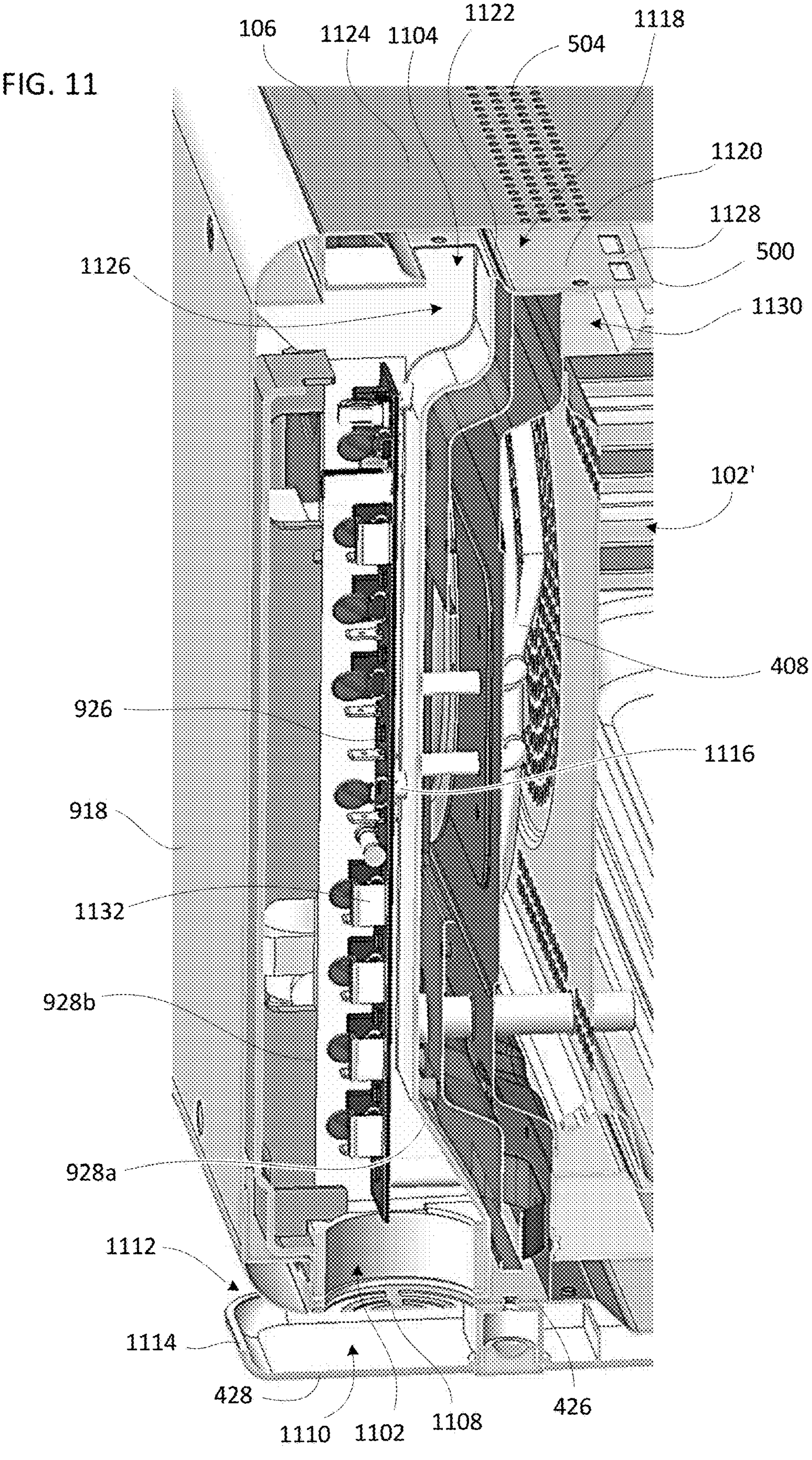
FIG. 11 is a cutaway isometric view of a portion the combination oven of FIG. 1, showing an exemplary PCB cooling arrangement.
Figure 12:
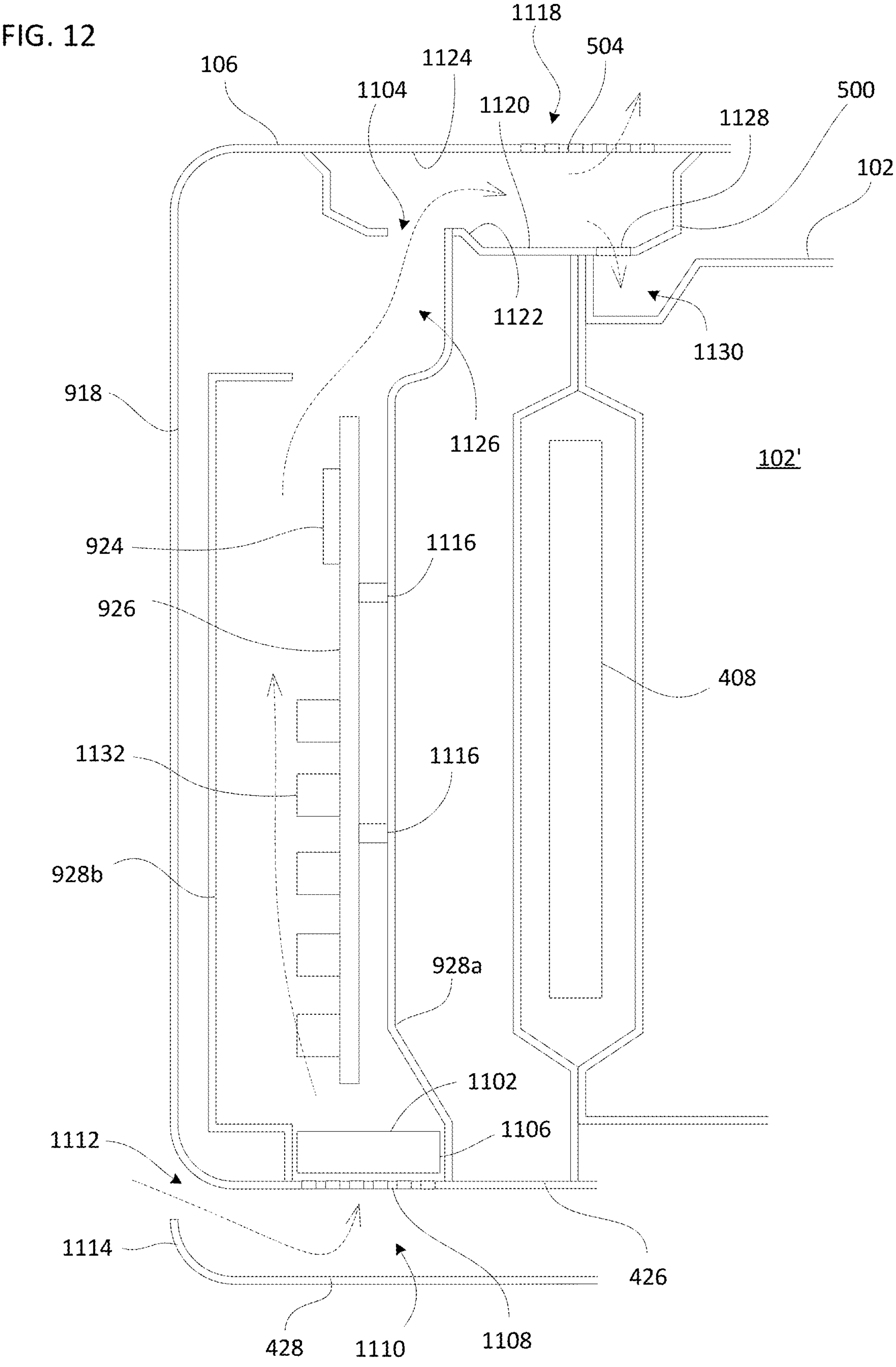
FIG. 12 is a schematic side view of a PCB cooling arrangement that may be used with embodiments of combination ovens.

Referring now to FIGS. 9, 11 and 12, the PCB (or PBCs) 926 and other electronics preferably are contained within the oven 100 in a manner that protects them from exposure to water or steam, while allowing sufficient air cooling to prevent overheating. A variety of different configurations are possible, but the shown example illustrates a preferred embodiment in which the power switching components 1132 (MOSFETs or the like) that generate relatively large quantities of heat are contained within an electronics housing 928. Such components may be mounted on a PCB 926, along with the microcontroller 924 and other electronics, but this is not strictly required. The housing 928 may have a clamshell construction formed by two halves 928*a*, 928*b* that are joined at their edges to form an enclosed passage, but other constructions are possible.

The housing 924 advantageously is oriented vertically, with an air inlet 1102 at the bottom, and an air outlet 1104 at the top. This provides a natural convection flow path to evacuate heat from the housing 924. One or more fans 1106 may be provided, such as at the inlet 1102 or outlet 1104, to generate additional cooling airflow through the housing from the inlet 1102 to the outlet 1104.

In the shown example, the inlet 1102 is adjacent to an inlet grate 1108 provided in the bottom enclosure wall 426. The inlet grate 1108 faces an open space 1110 between the bottom enclosure wall 426 and a base support 428. Airflow into the open space 1110 is permitted by a gap 1112 between an upturned perimeter edge 1114 of the base support 428 and the bottom enclosure wall 426. This arrangement protects against objects potentially covering the inlet grate 1108 during use. Furthermore, by providing the gap 1112 around a large area of the base support 428, airflow can be assured even if a portion of the gap 1112 is blocked.

The PCB 926 (and other electronics) preferably are mounted within the housing 928 such that they are spaced from the interior walls of the housing 928. This reduces heat convection to the housing 928, and exposes more of the PCB 926 to cooling airflow. Such mounting may be accomplished by mounting the PCB 926 on posts 1116 that extend from the interior housing wall. Also, as explained below, this helps prevent exposure to moisture that might accumulate within the housing 928.

The housing 928 also preferably includes features to help prevent the electronics from being exposed to moisture during use. This is a particular problem for portable steam ovens because, unlike wall-mounted ovens, the top surface of the oven is exposed during use. As such, steam can potentially condense on the top of the oven, or drip down onto the top of the oven from overhead objects such as cabinets. It is believed that this problem has led to many portable steam ovens being designed such that the electronics airflow cooling systems terminate at the sides or bottom of the oven, rather than the top. Such configurations avoid ingress of moisture towards the electronics, but can sacrifice cooling efficiency. Such configurations also require horizontal space within the oven housing, which can interfere with space that could otherwise be used for the cooking cavity. This leads to unnecessary complexity, reduced efficiency, and smaller oven capacity.

While embodiments of ovens according to the present disclosure may use horizontal electronics cooling passages and side or bottom air outlets, it is more preferred for the electronics housing 928 to be configured vertically, and generally along a straight line from the lower inlet 1102 to the upper outlet 1104. This provides a short and efficient cooling airflow path, in which natural and force convection cooperate to cool the electronics. An exemplary air flow path through the electronics housing 928 is shown in FIG. 12 by dashed lines. However, this arrangement presents the potential for condensed moisture to flow into the outlet 1104 and into contact with the electronics. This problem is addressed by configuring the oven 100 with a moisture trap 1118.

FIGS. 11 and 12 show details of an exemplary moisture trap 1118. The moisture trap 1118 comprises a dish-shaped well 1120 located adjacent to the air outlet 1104, and a barrier wall 1122 positioned between the well 1120 and the air outlet 1104. The barrier wall 1120 extends vertically higher than the well 1120, such that it prevents water in the well 1120 from flowing into the air outlet 1104. In this example, the well 1120 is conveniently formed in an upper surface of the upper heat shield 500, and the air outlet 1104 is located in one of the ventilation passages 504 extending through the upper heat shield 500. While this configuration provides an efficient use of the parts, it is not required in all cases.

The moisture trap 1118 also includes a solid cover wall 1124 that is located directly above the air outlet 1104 to prevent anything from falling directly into the air outlet 1104. In this case, the cover wall 1124 is formed by a portion of the upper wall of the exterior housing 106. The cover wall 1124 is adjacent to a vertical air vent, such as ventilation passages 504 through the upper wall of the housing 106. The horizontal spacing between the air outlet 1104 and the ventilation passages 504 may be minimized to prevent the need for air to flow horizontally any farther than necessary to avoid water ingress. In addition, the ventilation passages 504 may be located directly above the well 1120 to help ensure that any water flowing into the ventilation passages 504 proceeds directly to the well 1120. Thus, the moisture trap 1118 provides a significant barrier against water flowing into the electronics housing 928.

If desired, further measures can be taken to help protect the electronics from moisture. For example, in the shown embodiment, the air outlet 1104 may be formed in an offset region 1126 of the electronics housing 928, which is horizontally offset from the remainder of the electronics housing 928. Any water entering the air outlet 1104 will thus make initial contact with the inner wall of the electronics housing 928 within the offset region 1126, and then flow down the adjacent inner wall of the housing 928 while remaining out of contact with the PCB 926 which is offset from the wall by posts 1116. The presence of the moisture trap 1118 minimizes the quantity of any water entering the electronics housing 928 through the air outlet 1104, and thus it is expected that any water entering the offset region 1126 will cling to the wall until it is eventually evaporated by the heat of the electronics and the oven's heating elements.

Normal condensation of steam from an overhead object is expected to produce minimal moisture ingress into the ventilation passages 504, and such moisture is expected to accumulate in the well 1120 and evaporate harmlessly. However, there may be circumstances in which excessively large volumes of water might be present on the upper housing 106. For example, water from a drinking cup might be spilled on top of the oven 100. To address this, the moisture trap 1118 may be configured such that the ventilation passages 504 are protected from such flows. For instance, the ventilation passages might be formed at the top of a vertical protrusion that extends above the remainder of the oven's top surface, to make it less likely that such water will enter the moisture trap 1118.

The moisture trap 1118 also may be configured to be able handle excess flows that do enter it. For example, the well 1120 may be made relatively large (e.g., a capacity of a liter or more), or it may include one or more outlet to evacuate excess liquid. In the shown example, the well 1120 includes one or more drain openings 1128 that direct excess flow to a region 1130 located directly above the cooking chamber 102. Thus, any water that passes through the drain openings 1128 will be exposed to the relatively higher heat within region 1130, where the water will evaporate more quickly. The drain openings 1128 may be located at the lowest vertical point of the well 1120, or they may be located at some level above the lowest vertical point. In this case, the drain openings 1128 lead the water to a different location for evaporation within the oven 100, but other embodiments may direct the water elsewhere. For example, the drain openings 1128 may lead to a hose that connects to the drip tray 432, or to some location outside the oven 100. Other alternatives and variations will be apparent to persons of ordinary skill in the art in view of the present disclosure.

It will be appreciated from the foregoing that ovens may include one or more of the aforementioned features to provide various separate advantages. Various features can also collectively provide advantages. For example, the positions selected for the electronics, steam generator 900 and water tank 108 provides a greater volume of space for the cooking chamber 102. Such positioning is facilitated, in part, by the use of a vertical electronics housing to allow the electronics to extend vertically and take up relatively little horizontal space. Such positioning is also facilitated, in part, by the placement of steam ventilation passages below the water tank 108 rather than along the sides of the cooking chamber 102. Such positioning is also facilitated, in part, by the use of a raised bracket 914 to suspend the steam generator 900 to minimize heat conduction to other parts, such as the nearby electronics. Various other individual and collective advantages of the features described herein will become apparent with practice of embodiments and combinations thereof.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the subject of claimed inventions.

The invention claimed is:

1. A steam oven comprising:
- a housing;
- a cooking chamber located within the housing;
- a water tank receptacle connected to the housing, the water tank receptacle comprising:
  - a reservoir,
  - an inlet fitting positioned above the reservoir,
  - a false bottom positioned above the reservoir, and
- a reservoir outlet extending through a bottom of the reservoir;
- a water tank selectively positionable on the water tank receptacle above the false bottom, the water tank having an outlet fitting configured to fluidily connect to the inlet fitting upon positioning the water tank on the water tank receptacle;
- a drip tray positioned below the reservoir outlet;
- a steam generator fluidly connected between the inlet fitting and the cooking chamber; and
- a steam outlet system extending from the cooking chamber to the drip tray, wherein the steam outlet system comprises a steam outlet hose extending from the cooking chamber to a location in the water tank receptacle below the reservoir.

2. The steam oven of claim 1, wherein the false bottom comprises an opening through which at least one of the inlet fitting and outlet fitting passes when the water tank is positioned on the water tank receptacle.

3. The steam oven of claim 1, wherein the reservoir extends from a first end at a back of the housing to a second end at the front of the housing, the inlet fitting is adjacent the first end, and the reservoir outlet is adjacent the second end.

4. The steam oven of claim 1, further comprising an exhaust manifold located above the drip tray, and wherein the reservoir outlet and the steam outlet system are fluidly connected to the exhaust manifold.

5. The steam oven of claim 1, wherein the steam outlet system comprises one or more valves fluidly positioned between the steam outlet hose and the drip tray.

6. The steam oven of claim 5, wherein the one or more valves comprises an automatic pressure relief valve and a controllable pressure relief valve in parallel with the automatic pressure relief valve.

7. The steam oven of claim 5, wherein the one or more valves are located below the reservoir.

8. A steam oven comprising:
- a housing having a lower wall and an upper wall;
- a cooking chamber located within the housing;
- a water tank receptacle connected to the housing;
- a water tank selectively positionable on the water tank receptacle;
- an electronics housing located within the housing and extending from an air inlet located adjacent the lower wall to an air outlet located adjacent the upper wall;
- a moisture trap located at the air outlet; and
- a printed circuit board extending vertically within the electronics housing.

9. The steam oven of claim 8, further comprising a fan located at the air inlet and configured to direct an airflow upwards from the air inlet to the air outlet.

10. The steam oven of claim 8, wherein the air outlet is offset laterally from the printed circuit board.

11. The steam oven of claim 10, wherein the air outlet is positioned above an offset region of an inner wall of the electronics housing, and the printed circuit board is spaced from the inner wall.

12. The steam oven of claim 8, wherein the moisture trap comprises a solid cover wall located above the air outlet and a vent extending vertically through the upper wall at a location offset from the air outlet.

13. The steam oven of claim 8, wherein the moisture trap comprises a well located adjacent to the air outlet and separated from the air outlet by a barrier wall that extends vertically higher than the well.

14. The steam oven of claim 13, wherein the well comprises one or more drain openings.

15. The steam oven of claim 14, wherein the one or more drain openings are located above the cooking chamber.

* * * * *